United States Patent [19]

Baratella

[11] Patent Number: 4,739,800
[45] Date of Patent: Apr. 26, 1988

[54] MULTI-COMPONENT TUBULAR STRUCTURE FOR UNDERWATER CONVEYANCE OF FLUIDS

[75] Inventor: Paolo Baratella, Marcon, Italy

[73] Assignee: Oma di Baratella Paolo, Marcon, Italy

[21] Appl. No.: 924,449

[22] Filed: Oct. 29, 1986

[30] Foreign Application Priority Data

Oct. 29, 1985 [IT] Italy ............................... 82820 A/85

[51] Int. Cl.$^4$ ................................................ F16L 1/04
[52] U.S. Cl. ..................................... 138/103; 138/120; 138/178; 405/171; 405/172
[58] Field of Search ........................ 138/103, 120, 155; 405/158, 171, 172

[56] References Cited

U.S. PATENT DOCUMENTS 2,419,053  4/1947  Bennett .......................... 138/103 X
3,162,214 12/1964  Bazinet ............................. 138/120
3,267,969  8/1966  Mallard ........................... 138/103 X
3,290,429 12/1966  Prescott et al. ................. 138/120 X Primary Examiner—James E. Bryant, III
Attorney, Agent, or Firm—Browdy and Neimark

[57] ABSTRACT

A multi-component tubular structure for underwater conveyance of fluids comprising a plastic pipe, annular concrete ballast weights threaded along said pipe, and steel pulling rods. The pulling rods give the tubular structure tensile strength needed for underwater pipe laying, while the annular weights give overall uniform mechanical protection to the plastic pipe and a controlled negative buoyancy during the laying operation of the empty pie, and stability for the operating pipe. The tubular structure of the present invention combines the known advantages of plastic pipe, i.e., high flexibility, resistance to corrosion, with the advantages of coated steel pipe, i.e., ease of laying by the "bottom pull" method, high immersed wieght, and overall external mechanical protection.

6 Claims, 1 Drawing Sheet

MULTI-COMPONENT TUBULAR STRUCTURE FOR UNDERWATER CONVEYANCE OF FLUIDS

SUMMARY

The invention concerns a new tubular structure consisting essentially of:

(a) a plastic pipe suitable for conveyance of the relevant fluid, (b) annular concrete ballast weights, and (c) steel pulling-rods The annular weights are threaded along the plastic pipe so as to provide:

(a) overall external mechanical protection to the plastic pipe, (b) negative buoyancy (1) initially to allow easy underwater pipe laying and (2) subsequently to give stability to the operating pipe, and (c) anchorage for the pulling-rods.

The pulling-rods (made of steel or other traction-resistant material) are passed through, and anchored to, the annular weights, thus transfering to them the strong pulling force needed by the "bottom pull" method for underwater pipe laying, without stressing the internal plastic tube.

By these means a tubular structure is made available, in which the typical advantages of plastic pipe (low hydraulic friction, high flexibility, resistance to corrosion) are combined with those of coated steel pipes (ease of laying by the "bottom pull" method, high immersed weight, overall external mechanical protection).

FIELD OF THE INVENTION

The present invention relates to a tubular structure for underwater conveyance of fluids.

BACKGROUND OF THE INVENTION

The use of underwater pipelines for conveyance of fluids is wide-spread. For instance, pipelines for oil or for potable water are laid on, or buried in, the sea floor of across lakes and rivers, and long submarine outfalls are used for the discharge of treated or untreated effluents offshore.

The pipes employed for such purposes should conform, so far as possible, to various requirements: resistance to external and internal corrosion; sufficient flexibility to fit the bottom morphology with minimal dredging work; high immersed weight, to give the installed pipe good stability against the action of waves and currents, and to prevent the floating of the pipeline.

Such floating may be occasioned by the accidental intrusion of air into pipelines designed for conveying water; however, floating is avoided if the overall immersed weight of the pipe is so high that there is negative buoyance even when the pipe is empty of water. For pipelines buried in mud, the immersed weight needs to exceed the weight of the mud displaced.

Furthermore, an underwater pipeline should be:

(a) sufficiently strong to prevent damage from small anchors; fishing gear, etc., (b) essentially free of pronounced irregularities or protrusions which may be caught by anchors, fishing gear, etc.

A uniform and reasonably smooth surface is also required when conventional underwater pipe-burying machines are to be used. Such machines are driven (on wheels) along the pipeline to be buried, so that significant protrusions from the outer wall cannot be tolerated.

Finally, the pipeline should allow the use of a reliable and relatively cheap method of laying. Among such methods, the "bottom pull" method (which is often used for concrete-coated steel pipes) is of a particular importance. In this method, the pipeline is constructed near the shoreline, single pipes being joined in "strings" and successive strings joined together ashore as the launching of the pipeline progresses. At the shoreward end, the pipeline is supported by a series of rubber wheels, which allow the forward movement to proceed with minimal resistance. The immersed pipeline moves forward (being pulled towards a barge equipped with a winch), sliding over the bed of the sea, river or lake on which it is to be laid.

During the pulling, the effective weight of the immersed pipeline is kept sufficiently small to reduce the frictional resistance on the bed, so avoiding the requirement of excessive pulling force. This is achieved, for instance, during the pulling of steel pipes by keeping them empty of water and using a concrete coating of suitable thickness. The requirements of the weighted pipeline to be laid by this method thus include:

(A) an essentially uniform outer wall—to avoid hindrance on the rubber wheels and the bed during pulling, (B) adjustment of the immersed weight—by keeping the pipe empty of water, and (C) sufficient strength to withstand the large pulling force that may be required.

These requirements have not hertofore been consistent with the use of plastic pipes, such pipes being weighted with spaced loads; consequently the "bottom pull" of the weighted pipeline is not feasible, nor, in practice, can the immersed weight be properly controlled. Although traction-resistant joints for plastic pipes have been developed, plastic pipelines often cannot withstand the pulling forces needed unless costly over-sizing of thickness of the pipe material is adopted.

Accordingly, despite the advantages (already listed) of plastic pipelines, their use for underwater—and particularly for submarine—laying is restricted by:

(1) limitations in tensile strength, (2) the cost and time involved in the fitting of weights, (3) the inadequacy of spaced weights, and (4) the exposure to damage from anchors, fishing gear, etc. because of the limited immersed weight, absence of an adequate coating of the outer plastic surface, and the protrusions created by the spaced weights. Furthermore, these weights preclude the use of pipe-burying machines.

SUMMARY OF THE INVENTION

The main advantages, already cited, peculiar to different types of pipe have been combined, it is claimed, in the new tubular structure described below.

Figure 1:
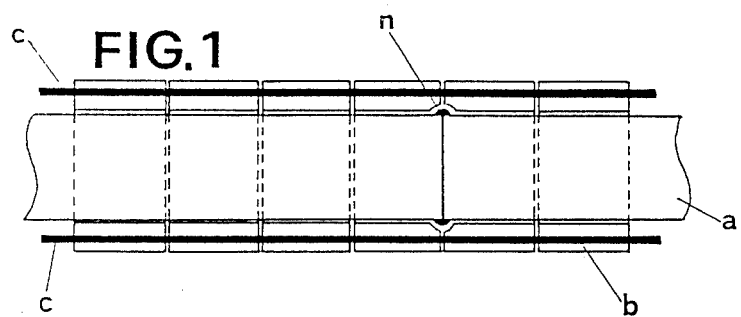
FIG. 1 shows a longitudinal section of the tubular structure, including the plastic pipe, annular weights, and pulling rods.
Figure 2:
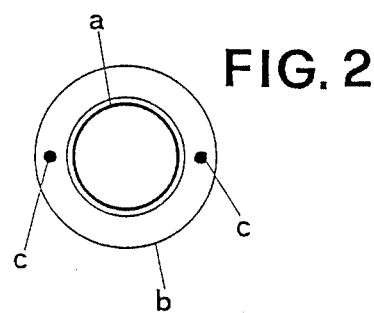
FIG. 2 shows a cross section of the tubular structure.

The above-mentioned tubular structure consists of:

(a) A plastic pipe (a in FIGS. 1 and 2), made of, for instance, reinforced glass fibre, suitable for conveyance of the particular fluid being transported—due account being taken of working and testing pressures, and of the external pressure of the water mass during the pulling operation when the pipe is empty of water.

(b) annular weights (or "rings") of inert material such as concrete or reinforced concrete. These rings (b in FIGS. 1 and 2) are threaded around and along the pipe; a small clearance between pipe and rings makes the fitting of the rings easier and allows free bending of the pipe, and this is aided by tapering of the edges of the rings.

Of course, such rings may also be cast, using the pipe as a former, with the help of soft spacing collars made of such material as rubber or polyethylene. The rings are designed to give an overall immersed weight (when the pipe is empty of water) suitable for the "bottom pull" as described earlier.

The sliding of the rings along the pipe is prevented by ribs (n in FIG. 1) protruding from the outer wall of the pipe at suitable intervals. These ribs may conveniently be constructed at the pipe joints.

(c) One or more pairs of rods (made, for example, of steel) which run parallel to the pipe (c in FIGS. 1 and 2) through prepared holes in the rings. These rods are designed to sustain the maximum pulling force induced by the "bottom pull" method of pipe laying.

Longitudinal connection between the rods and rings is attained by means of small discs welded to the rods.

The "bottom pull" laying operations, here adapted to the case of plastic, instead of steel, pipes are as follows:

The "strings" of pipes (d in FIG. 3) are prepared ashore, so as to give the required overall length of the pipeline.

Each string is made by joining together individual units of the tubular structure described above. This joining may be by welding—both of the ends of the plastic pipes and of the rods so as to produce jointless pulling rods.

Figure 3:
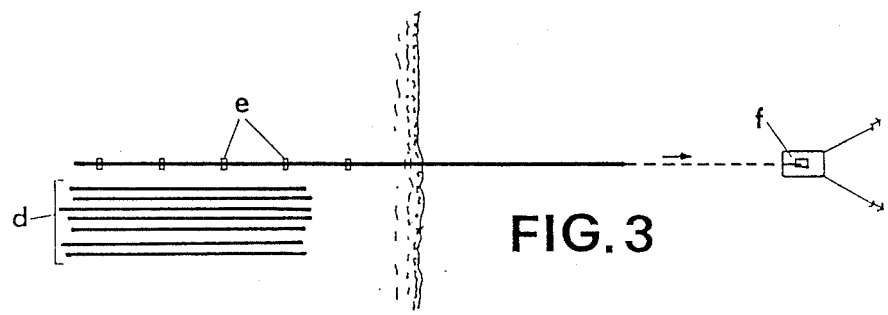
FIG. 3 shows a schematic layout of the laying operations according to the present invention in plan view.
Figure 4:
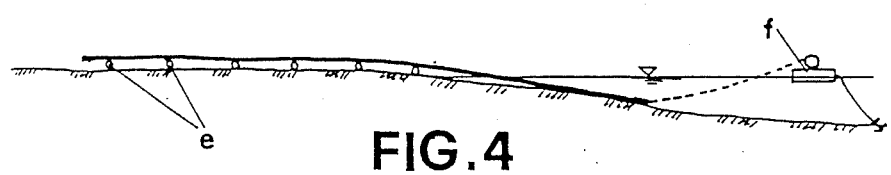
FIG. 4 shows a schematic layout of the layer operations according to the present invention in a longitudinal view.

The strings so constructed from pipes, rings and rods, are supported by a suitable structure of beams which allow easy rolling of the strings and the loading onto the rubber wheels (e in FIGS. 3 and 4).

The laying proceeds by pulling with a winch (f in FIGS. 3 and 4) mounted on a well-anchored barge offshore.

The pipeline (containing no water) slides forward from the rollers and along the bed.

Coupling between successive strings can be effected by welding the ends (as already mentioned) or by other methods; in any case, the coating of the pipe can be completed, around the joints, by means of tubular moulds and a cast of quick-setting compound (e.g, quick-setting concrete).

When the pull of the whole pipeline has been completed, the pipeline is filled with water and (if necessary) is buried in the bed by means of pipe-burying machines which, by virtue of the design of the pipeline, can thus be used for plastic pipes—essentially because of the uniformity of the outer wall and the adequate weight.

Such a tubular structure, once positioned, shows the main advantages of plastic pipes (regarding corrosion resistance, small loss of hydraulic head, adaptability to bed morphology) together with those advantages formerly confined to non-plastic pipes: strong mechanical protection all over the outer wall; high immersed weight—sufficient to keep the pipe (as may be required for maintenance); and ballasting load distributed evently along the pipe—instead of the concentrated loads induced by spaced weights which may cause irregular settling of the pipeline and consequent dangerous stressing.

Finally, it may be remarked that the special characteristics of the tubular structure herein described make it suitable for other laying techniques (such as the "lay barge" and "controlled floating" methods) owing to its high tensile strength, the ease of control of the immersed weight, the small bending radius typical of plastic pipes, and the quasi-uniform outer wall.

I claim:

1. A multi-component tubular structure for the conveyance of fluids underwater comprising:
    a pipe made of fiberglass-reinforced plastic;
    said plastic pipe being coated and weighted with independent adjacently located rings of an inert material;
    said rings having tapered edges;
    said pipe being reinforced lengthwise by rods of traction-resistant material threaded through said rings.

2. The multi-component tubular structure of claim 1 wherein the rods bear traction stress induced by the bottom pull method of laying the structure in place.

3. The multi-component tubular structure of claim 1 wherein the plastic pipe is provided with mechanical protection of the outer wall.

4. The multi-component tubular structure of claim 1 wherein ballast on the pipe is uniformly distributed longitudinally.

5. The multi-component tubular structure of claim 1 wherein the indenpendent rings are made of concrete.

6. The mult-component tubular structure of claim 1 wherein the rods are made of metal.

* * * * *